US012779467B2

(12) United States Patent
Hsu et al.

(10) Patent No.: US 12,779,467 B2
(45) Date of Patent: Nov. 3, 2026

(54) BIOCHIP AND MANUFACTURING METHOD THEREOF

(71) Applicant: EPISIL TECHNOLOGIES INC., Hsinchu County (TW)

(72) Inventors: Wen Ting Hsu, Hsinchu County (TW); De Chuan Liu, Hsinchu County (TW); Kuo Yu Li, Hsinchu County (TW)

(73) Assignee: EPISIL TECHNOLOGIES INC., Hsinchu County (TW)

( * ) Notice: Subject to any disclaimer, the term of this patent is extended or adjusted under 35 U.S.C. 154(b) by 502 days.

(21) Appl. No.: 18/426,353

(22) Filed: Jan. 30, 2024

(65) Prior Publication Data

US 2025/0083144 A1 Mar. 13, 2025

(30) Foreign Application Priority Data

Sep. 12, 2023 (TW) ................................ 112134650

(51) Int. Cl.
*B01L 3/00* (2006.01)

(52) U.S. Cl.
CPC . *B01L 3/502753* (2013.01); *B01L 2300/0819* (2013.01); *B01L 2300/0874* (2013.01); *B01L 2300/0887* (2013.01)

(58) Field of Classification Search
CPC ......... G01N 27/4145; B01L 2300/0819; B01L 2300/0874; B01L 2300/0887; B01L 3/502753
See application file for complete search history.

(56) References Cited

U.S. PATENT DOCUMENTS

| | | | | |
|---|---|---|---|---|
| 2012/0190040 A1* | 7/2012 | Talebpour | ......... | B01L 3/502715 435/7.1 |
| 2014/0171343 A1 | 6/2014 | Su et al. | | |
| 2021/0190722 A1* | 6/2021 | Takei | ................. | A61B 5/14517 |

FOREIGN PATENT DOCUMENTS

| | | |
|---|---|---|
| JP | 2008128803 | 6/2008 |
| JP | 2012073104 | 4/2012 |
| JP | 2020046260 | 3/2020 |

(Continued)

OTHER PUBLICATIONS

TW20233645 A translation (Year: 2023).*
"Office Action of Japan Counterpart Application", issued on Apr. 9, 2025, p. 1-p. 3.

*Primary Examiner* — Jennifer Wecker
(74) *Attorney, Agent, or Firm* — JCIPRNET

(57) ABSTRACT

A biochip includes a substrate, an insulating layer, a semiconductor layer, a dielectric layer, a metal layer, and a protective layer. The semiconductor layer is disposed on the insulating layer and has a reaction region. The dielectric layer is disposed on the semiconductor layer and has a first opening. The metal layer is disposed on the dielectric layer and includes a source, a drain, and a wall structure. The wall structure surrounds the first opening, the source, and the drain. The protective layer is disposed on the metal layer and has a flat part, a protruding part, a second opening, and a third opening. The flat part surrounds and defines the second opening. The protruding part is disposed corresponding to the wall structure, and the protruding part surrounds and defines the third opening. The second opening connects the third opening and the first opening to expose the reaction region.

10 Claims, 11 Drawing Sheets

(56) References Cited

FOREIGN PATENT DOCUMENTS

| | | |
|---|---|---|
| JP | 2021099330 | 7/2021 |
| JP | 2022540297 | 9/2022 |
| TW | 201802454 | 1/2018 |
| TW | 1777376 | 9/2022 |
| TW | 202334645 | 9/2023 |
| WO | 2019225660 | 11/2019 |

* cited by examiner

BIOCHIP AND MANUFACTURING METHOD THEREOF

CROSS-REFERENCE TO RELATED APPLICATION

This application claims the priority benefit of Taiwan application serial no. 112134650, filed on Sep. 12, 2023. The entirety of the above-mentioned patent application is hereby incorporated by reference herein and made a part of this specification.

BACKGROUND

Technical Field

This disclosure relates to a semiconductor chip and a manufacturing method thereof, and in particular to a biochip and a manufacturing method thereof.

Description of Related Art

In a typical biochip, the space available for the solution to be tested is usually limited by the size of the reaction region, and therefore overflow of the solution to be tested is likely to occur when the solution to be tested is in large quantities or when there is an error in the addition of the solution to be tested.

SUMMARY

The disclosure provides a biochip and a manufacturing method thereof, capable of avoiding a problem of overflow of a solution to be tested and coping with a large amount of the solution to be tested. In this way, when multiple reaction regions are disposed in the biochip, the reaction regions may be utilized to detect different kinds of biological materials respectively, and there is no need to worry about a problem of cross-contamination due to the overflow of the solution to be tested between the different reaction regions, thus achieving an effect of detecting multiple biological materials at the same time.

The biochip of the disclosure may be configured to detect a biological material in a solution to be tested. The biochip includes a substrate, an insulating layer, a semiconductor layer, a dielectric layer, a metal layer, and a protective layer. The insulating layer is disposed on the substrate. The semiconductor layer is disposed on the insulating layer and has a reaction region. The dielectric layer is disposed on the semiconductor layer and has a first opening. The metal layer is disposed on the dielectric layer and includes a source, a drain, and a wall structure. The source and the drain are electrically connected to the semiconductor layer respectively. The wall structure surrounds the first opening, the source, and the drain. The protective layer is disposed on the metal layer and has a flat part, a protruding part, a second opening, and a third opening. The flat part surrounds and defines the second opening. The protruding part is disposed corresponding to the wall structure, and the protruding part surrounds and defines the third opening. The second opening connects the third opening and the first opening to expose the reaction region.

In an embodiment of the disclosure, the source, the drain, and the wall structure are separated from each other, and the source and the drain are electrically insulated from the wall structure.

In an embodiment of the disclosure, in a three-dimensional view of the biochip, the wall structure does not completely surround the first opening.

In an embodiment of the disclosure, in a three-dimensional view of the biochip, the wall structure completely surrounds the first opening.

In an embodiment of the disclosure, a minimum distance between the wall structure and the source is 0.1 micrometers to 5 micrometers.

In an embodiment of the disclosure, in a three-dimensional view of the biochip, the third opening is larger than the second opening.

In an embodiment of the disclosure, the protruding part completely surrounds the first opening and the second opening.

In an embodiment of the disclosure, the solution to be tested is disposed in the first opening, and an upper surface of the solution to be tested is between an upper surface of the protruding part and an upper surface of the flat part.

In an embodiment of the disclosure, the metal layer further includes a source extension pad and a drain extension pad, and the biochip further includes a first transfer pad and a second transfer pad. The first transfer pad and the second transfer pad are disposed on the insulating layer respectively. The source is electrically connected to the source extension pad through the first transfer pad, and the drain is electrically connected to the drain extension pad through the second transfer pad.

The manufacturing method of a biochip of the disclosure includes the following. A substrate is provided. An insulating layer is formed on the substrate. A semiconductor layer is formed on the insulating layer. The semiconductor layer has a reaction region. A dielectric layer is formed on the semiconductor layer. The dielectric layer has a first opening. A metal layer is formed on the dielectric layer. The metal layer includes a source, a drain, and a wall structure. The source and the drain are electrically connected to the semiconductor layer respectively, and the wall structure surrounds the first opening, the source, and the drain. A protective layer is formed on the metal layer. The protective layer has a flat part, a protruding part, a second opening, and a third opening. The flat part surrounds and defines the second opening. The protruding part is disposed corresponding to the wall structure, and the protruding part surrounds and defines the third opening. The second opening connects the third opening and the first opening to expose the reaction region.

Based on the above, in the biochip and the manufacturing method thereof according to an embodiment of the disclosure, the setting of the wall structure enables the protruding part to be formed at the same time as the protective layer is formed, and thus has an effect of simplifying the process. As the protruding part may be a closed figure surrounding the first opening, the solution to be tested may be limited within the third opening to avoid overflow of the solution to be tested from outside the third opening. Compared with a general biochip, the biochip of the disclosure may increase the volume of the biochip that can hold the solution to be tested through the setting of the third opening, so as to avoid the overflow of the solution to be tested and to cope with a larger amount of the solution to be tested, and to improve the operation margin and convenience of the biochip. In this way, when multiple reaction regions are disposed in the biochip of the disclosure, the reaction regions may be utilized to detect different kinds of biological materials respectively, and there is no need to worry about a problem of cross-contamination due to the overflow of the solution to be tested between the different reaction regions, thus achieving an effect of detecting multiple biological materials at the same time.

To make the aforementioned more comprehensible, several embodiments accompanied with drawings are described in detail as follows.

BRIEF DESCRIPTION OF THE DRAWINGS

The accompanying drawings are included to provide a further understanding of the disclosure, and are incorporated in and constitute a part of this specification. The drawings illustrate example embodiments of the disclosure and, together with the description, serve to explain the principles of the disclosure.

DESCRIPTION OF THE EMBODIMENTS

Figure 1:
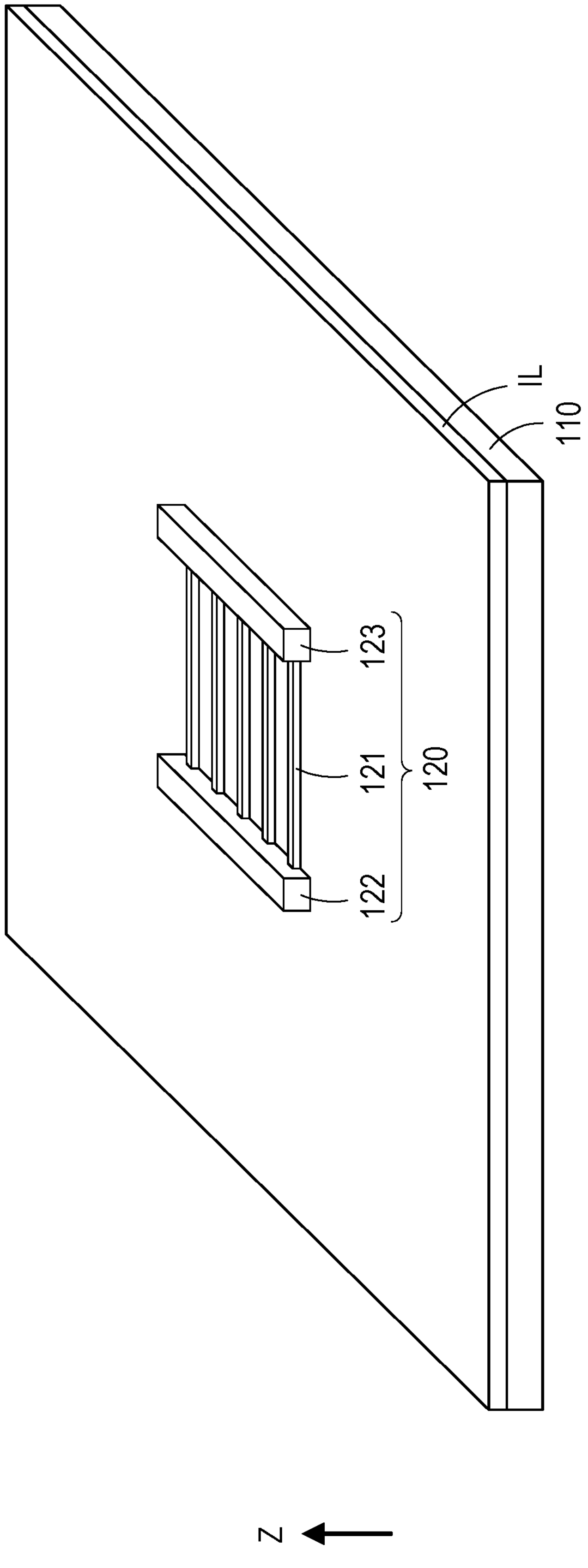
FIG. 1 to FIG. 4 are schematic three-dimensional views of a manufacturing method of a biochip according to an embodiment of the disclosure.

FIG. 1 to FIG. 4 are schematic three-dimensional views of a manufacturing method of a biochip according to an embodiment of the disclosure. FIG. 5 is a schematic cross-sectional view of the biochip of FIG. 4 along a section line I-I'. FIG. 6 is a schematic cross-sectional view of the biochip of FIG. 4 along a section line II-II'. For clarity of the drawing and ease of illustration, a semiconductor layer 120, a metal layer 140, and a solution to be tested 200 in a biochip 100 are omitted in FIG. 4.

Figure 4:
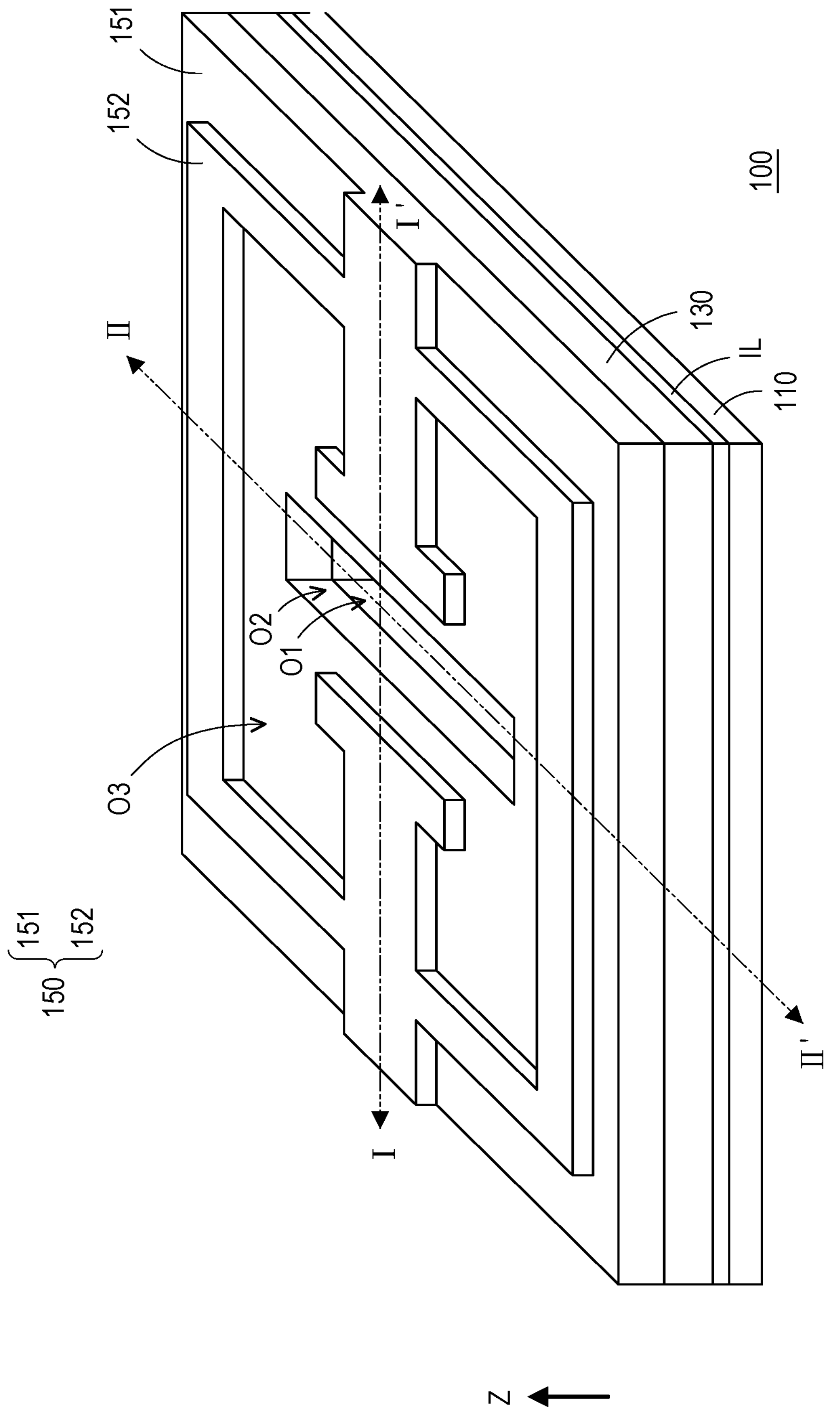
Figure 5:
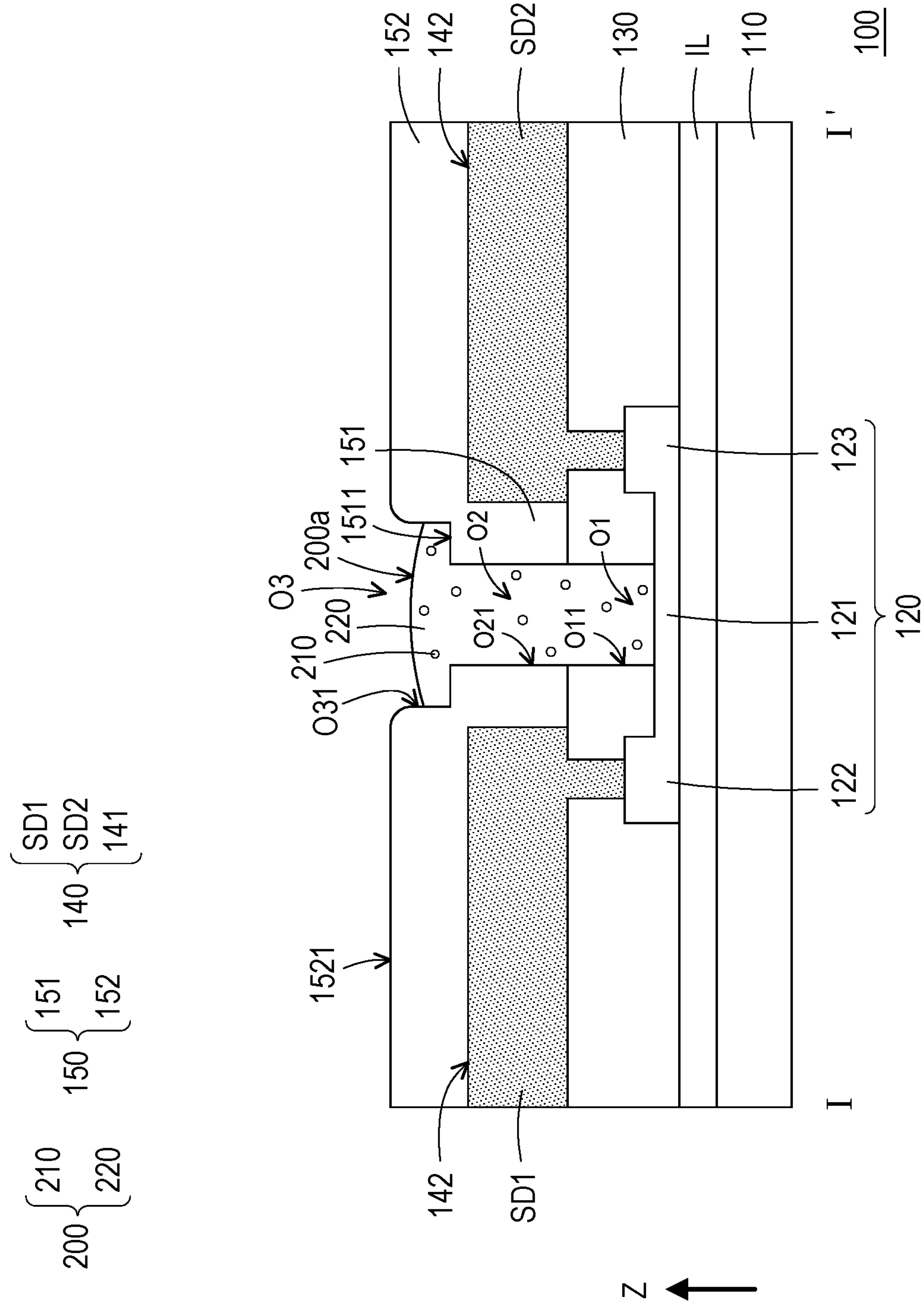
FIG. 5 is a schematic cross-sectional view of the biochip of FIG. 4 along a section line I-I'.
Figure 6:
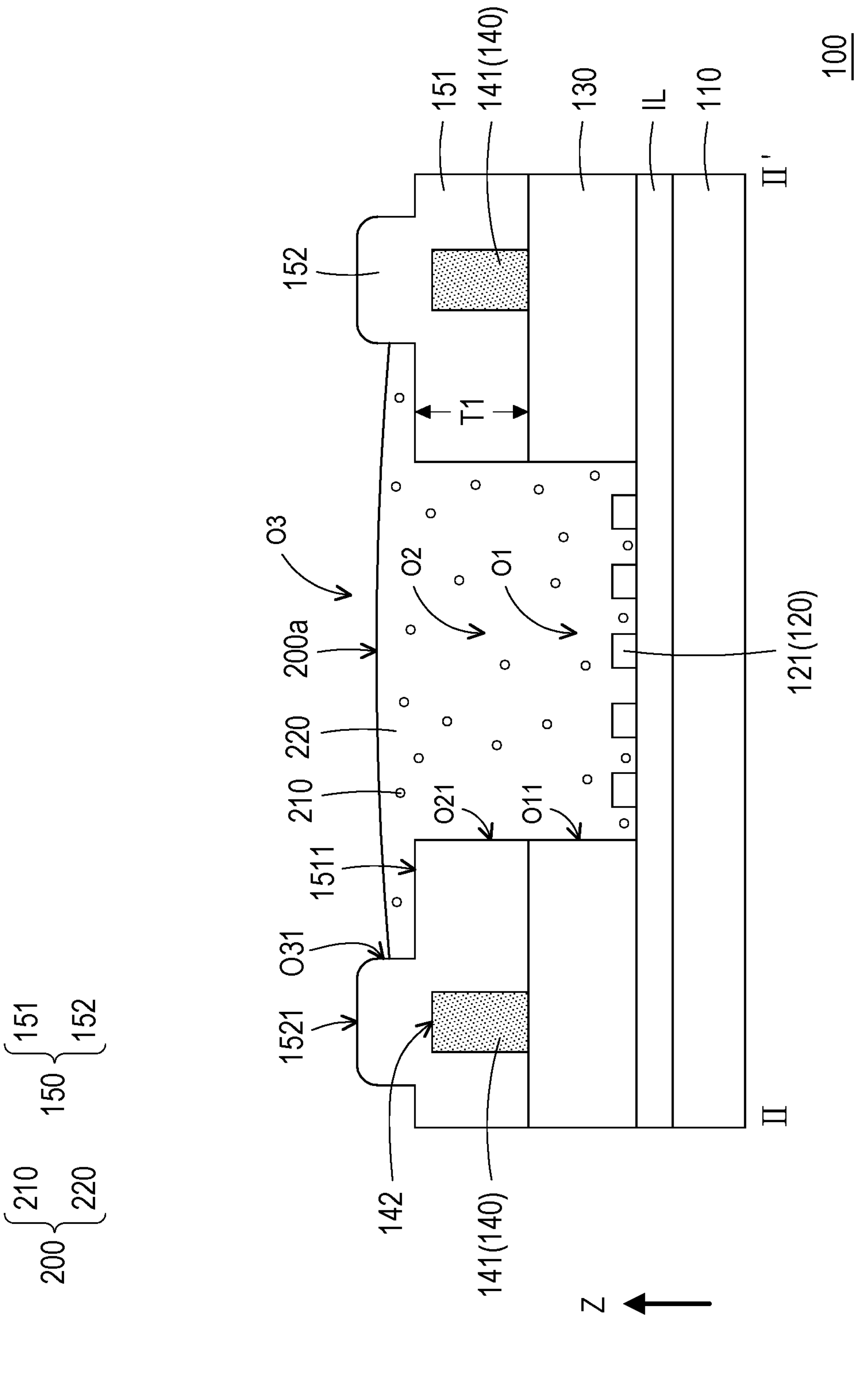
FIG. 6 is a schematic cross-sectional view of the biochip of FIG. 4 along a section line II-II'.

Referring to FIG. 4 to FIG. 6 first, the biochip 100 of this embodiment may include a substrate 110, an insulating layer IL, a semiconductor layer 120, a dielectric layer 130, a metal layer 140, and a protective layer 150. The insulating layer IL is disposed on the substrate 110. The semiconductor layer 120 is disposed on the insulating layer IL and has a reaction region 121. The dielectric layer 130 is disposed on the semiconductor layer 120 and has a first opening O1. The metal layer 140 is disposed on the dielectric layer 130 and includes a source SD1, a drain SD2, and a wall structure 141. The source SD1 and the drain SD2 are electrically connected to the semiconductor layer 120 respectively. The wall structure 141 surrounds the first opening O1, the source SD1, and the drain SD2. The protective layer 150 is disposed on the metal layer 140 and has a flat part 151, a protruding part 152, a second opening O2 and a third opening O3. The flat part 151 surrounds and defines the second opening O2. The protruding part 152 is disposed corresponding to the wall structure 141, and the protruding part 152 surrounds and defines the third opening O3. The second opening O2 connects the third opening O3 and the first opening O1 to expose the reaction region 121. In addition, the biochip 100 of this embodiment may be configured to detect a biological material 210 in the solution to be tested 200.

A manufacturing method of the biochip 100 of this embodiment will be described below. The manufacturing method of the biochip 100 of this embodiment may include the following steps.

First, referring to FIG. 1, a substrate 110 is provided. In this embodiment, the substrate 110 may be a silicon substrate or a silicon wafer. For example, the substrate 110 may be a P-type silicon substrate, but is not limited thereto.

Next, referring to FIG. 1, an insulating layer IL is formed on the substrate 110. In this embodiment, the insulating layer IL may be, for example, a gate oxide layer, but is not limited thereto.

Next, referring to FIG. 1, a semiconductor layer 120 is formed on the insulating layer IL. In this embodiment, the semiconductor layer 120 has a reaction region 121, a source region 122, and a drain region 123. The reaction region 121 is located between the source region 122 and the drain region 123. In this embodiment, a material of the semiconductor layer 120 may include polysilicon or other suitable semiconductor materials, but is not limited thereto. In some embodiments, the semiconductor layer 120 may be regarded as a channel in the transistor structure. Thus, when a threshold voltage of the semiconductor layer 120 is exceeded, the channel may be opened and current may pass.

In some embodiments, a recognition unit (not shown) may be provided on the reaction region 121 of the semiconductor layer 120 to specifically recognize and combine with the biological material 210 in the solution to be tested 200. Specifically, one end of the recognition unit may be connected and fixed to the reaction region 121, and the other end of the recognition unit may be used to recognize and combine with the biological material 210. The recognition unit may be a chemical molecule or a biological molecule. For example, the recognition unit may be an antibody, an antigen, a nucleic acid, a carbohydrate, or a combination thereof, but is not limited thereto, as long as the recognition unit can specifically recognize and combine with the biological material 210.

Figure 2:
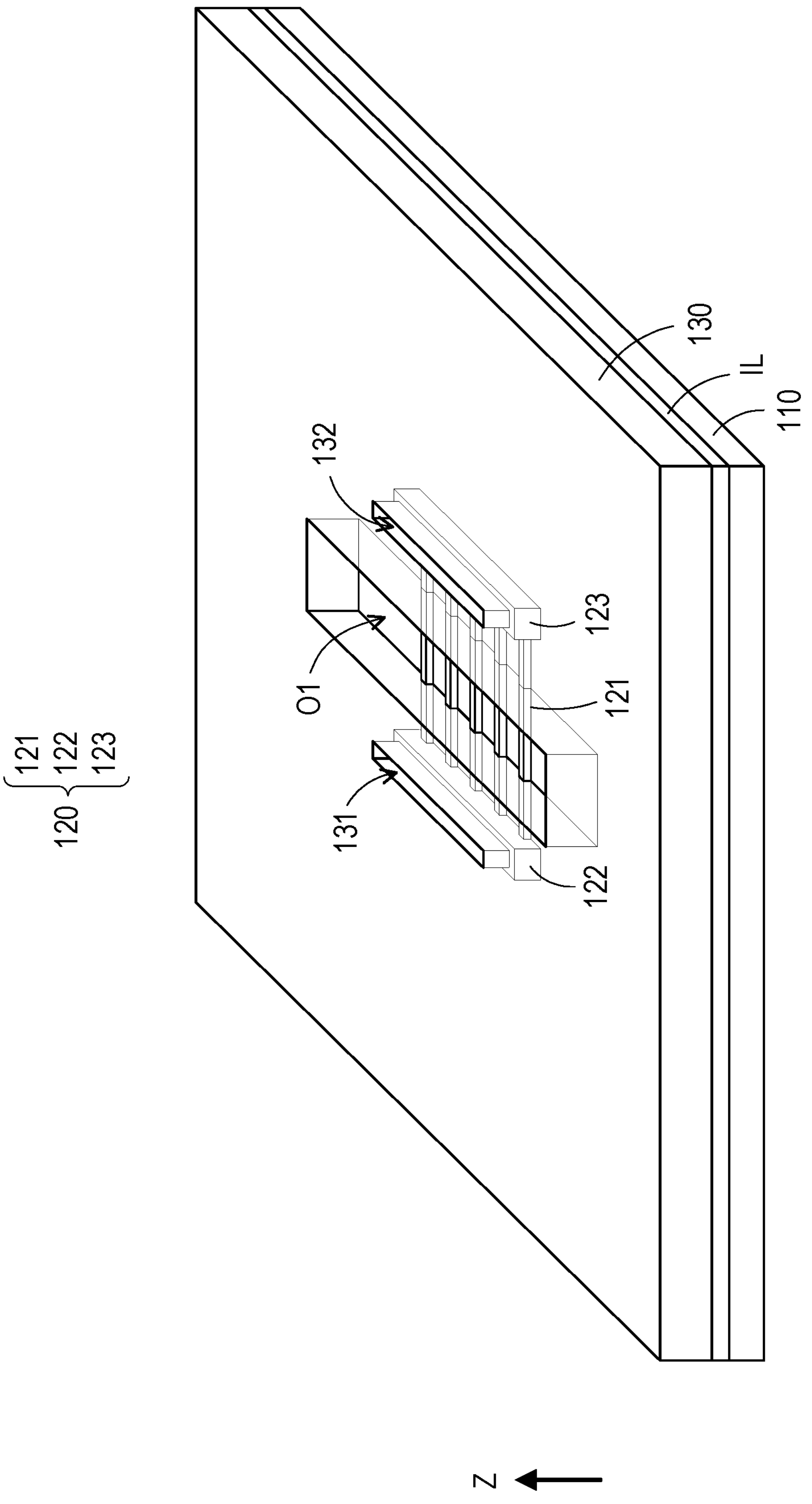

Then, referring to FIG. 2, a dielectric layer 130 is formed on the semiconductor layer 120. The dielectric layer 130 has a first opening O1, an opening 131 and an opening 132. The first opening O1 may expose the reaction region 121 and a part of the insulating layer IL, and the first opening O1 has a side wall O11. The opening 131 may expose a part of the source region 122, and the opening 132 may expose a part of the drain region 123.

Figure 3:
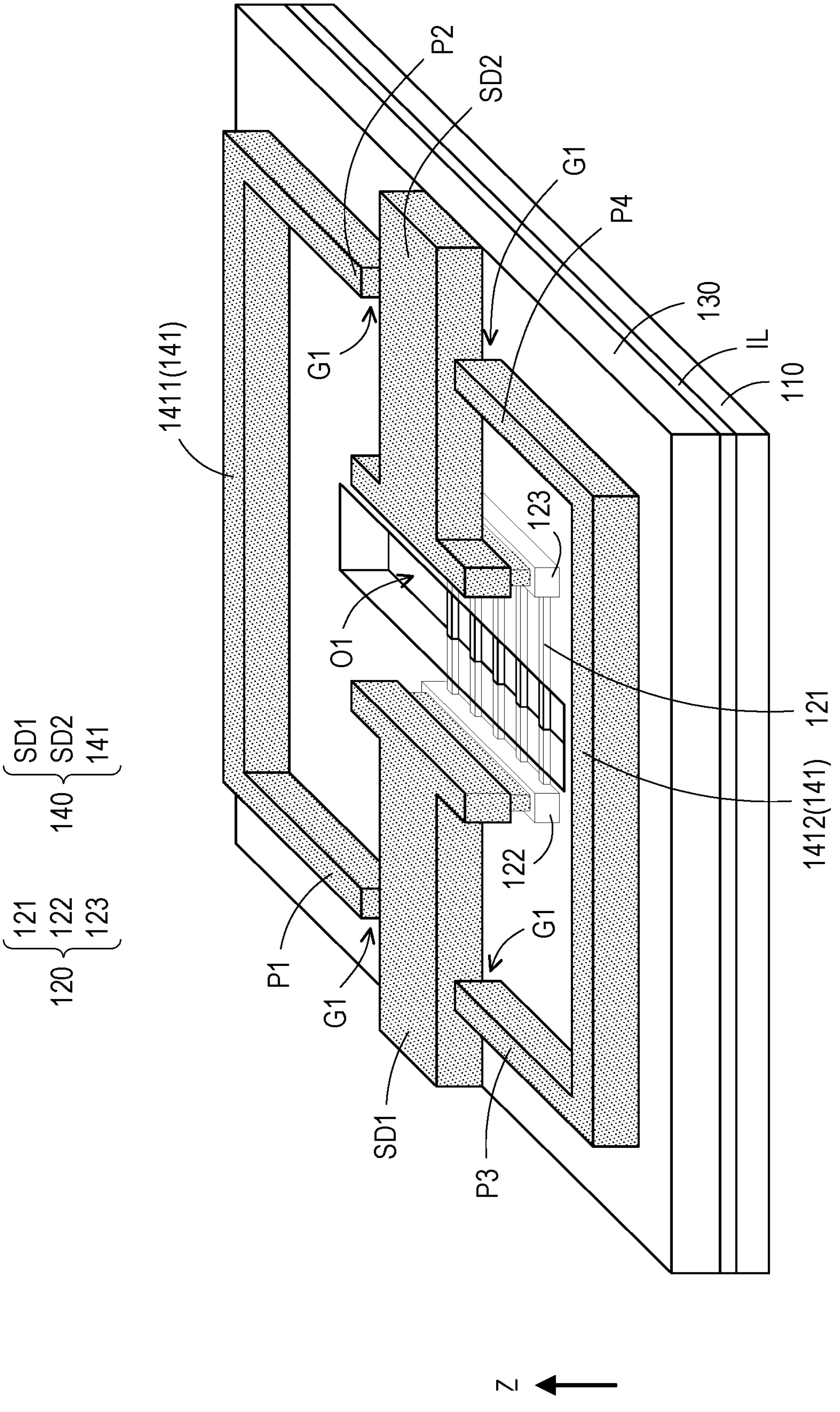

Then, referring to FIG. 3, a metal layer 140 is formed on the dielectric layer 130. In this embodiment, the metal layer 140 may cover a part of the dielectric layer 130 and expose another part of the dielectric layer 130. The metal layer 140 may include a source SD1, a drain SD2, and a wall structure 141. The source SD1 may be disposed on the dielectric layer 130 and in the opening 131, and the drain SD2 may be disposed on the dielectric layer 130 and in the opening 132, so that the source SD1 and the drain SD2 may be electrically connected to the source region 122 and the drain region 123 of the semiconductor layer 120 respectively. The source SD1, the drain SD2, and the wall structure 141 are disposed on the same layer, and the source SD1, the drain SD2, and the wall structure 141 are physically separated from each other. The source SD1 and the drain SD2 may be electrically insulated from the wall structure 141.

In this embodiment, in a three-dimensional view of the biochip 100, the wall structure 141 may surround the first opening O1, the source SD1, and the drain SD2, and the wall structure 141 does not completely surround the first opening O1. Specifically, in this embodiment, the wall structure 141 may include a first part 1411 and a second part 1412. The first part 1411 has endpoints P1 and P2, and the second part 1412 has endpoints P3 and P4. There is a minimum distance G1 between the endpoint P1 and the source SD1, between the endpoint P3 and the source SD1, between the endpoint P2 and the drain SD2, and between the endpoint P4 and the drain SD2. The minimum distance G1 may be, for example, 0.1 micrometers (μm) to 5 micrometers, so that the minimum distance G1 may be filled and stacked up as a part of the protruding part 152 by the protective layer 150 subsequently formed, but is not limited thereto. When the minimum distance G1 is less than 0.1 micrometers, there is a risk of short circuit or bridge connection between the wall structure 141 and the source SD1 (or the drain SD2); when the minimum distance G1 is greater than 5 micrometers, there is a risk that the protective layer formed subsequently will not be able to fill in the gap, resulting in the annular protruding 152 having a notch. For example, when a thickness T1 of the protective layer 150 is 1 micrometer, the minimum distance G1 may be 1.2 micrometers, so that the protective layer 150 subsequently formed may fill the minimum distance G1. In addition, in this embodiment, outline shapes of the first part 1411 and the second part 1412 may be U-shaped, but are not limited thereto.

Then, referring to FIG. 4 to FIG. 6, the protective layer 150 is formed on the metal layer 140. In this embodiment, the protective layer 150 has a flat part 151, a protruding part 152, a second opening O2 and a third opening O3. The flat part 151 may cover the another part of the dielectric layer 130 exposed by the metal layer 140, and the flat part 151 may be disposed adjacent to the metal layer 140. The flat part 151 surrounds and defines the second opening O2. The flat part 151 has an upper surface 1511 facing away from the dielectric layer 130. In this embodiment, the thickness T1 of the protective layer 150 may be, for example, 1 micrometer to 3 micrometers, but is not limited thereto.

The second opening O2 may connect the third opening O3 and the first opening O1 to expose the reaction region 121, and the second opening O2 may correspond to and overlap the first opening O1 in the normal direction Z of the substrate 110. The second opening O2 has a side wall O21. The side wall O21 of the second opening O2 may be substantially flush with the side wall O11 of the first opening O1, but is not limited thereto.

The protruding part 152 is disposed on the metal layer 140 and the flat part 151, and the protruding part 152 may be disposed corresponding to and overlap the wall structure 141, the source SD1, and the drain SD2 in the normal direction Z of the substrate 110. The protruding part 152 may surround and define the third opening O3, and the protruding part 152 may be disposed to form the third opening O3. The protruding part 152 may completely surround the first opening O1 and the second opening O2. The protruding part 152 has an upper surface 1521 facing away from the metal layer 140. The upper surface 1521 of the protruding part 152 may be higher than the upper surface 1511 of the flat part 151 in the normal direction Z of the substrate 110.

In some embodiments, the protruding part 152 may be regarded as a three-dimensional structure in which the protective layer 150 protrudes from an upper surface 142 (i.e., a surface of the metal layer 140 facing away from the dielectric layer 130) of the metal layer 140 in a direction away from the metal layer 140 and is continuous. In some embodiments, in a top view of the biochip 100, the shape of the protruding part 152 may viewed as a closed and unnotched ring to avoid the solution to be tested 200 from flowing out.

The third opening O3 may be connected to the second opening O2, and the third opening O3 may correspond to and overlap the second opening O2 in the normal direction Z of the substrate 110. The third opening O3 has a side wall O31. The side wall O31 of the third opening O3 is not flush with the side wall O21 of the second opening O2. Furthermore, in the three-dimensional view of the biochip 100, the third opening O3 may be larger than the first opening O1, the second opening O2, and the reaction region 121.

Next, referring to FIG. 5 and FIG. 6, the solution to be tested 200 may include a biological material 210 and a liquid 220. The solution to be tested 200 may include, for example, a body fluid such as serum, and the biological material 210 may include, for example, microorganisms or biological molecules, but is not limited thereto. The microorganisms may include, for example, bacteria, viruses, or combinations thereof, and the biological molecules may include, for example, nucleic acids (including deoxyribonucleic acids, ribonucleic acids, or combinations thereof), nucleotides, proteins, carbohydrates, lipids, or combinations thereof, but are not limited thereto.

In this embodiment, the solution to be tested 200 may be disposed in the first opening O1, the second opening O2, and the third opening O3, and an upper surface 200*a* of the solution to be tested 200 may cover the upper surface 1511 of the flat part 151 in the third opening O3. In the normal direction Z of the substrate 110, the upper surface 200*a* of the solution to be tested 200 may be higher than the upper surface 1511 of the flat part 151, and the upper surface 200*a* of the solution to be tested 200 may be between the upper surface 1521 of the protruding part 152 and the upper surface 1511 of the flat part 151.

In this embodiment, the setting of the wall structure 141 enables the protruding part 152 to be formed at the same time as the protective layer 150 is formed, and therefore no additional process steps are required to manufacture the protruding part 152 that can be used to form the third opening O3, which has an effect of simplifying the process.

In this embodiment, since the wall structure 141 may surround the first opening O1, the source SD1, and the drain SD2, the protruding part 152 disposed above the wall structure 141 may be a closed figure (e.g., a closed rectangle, but not limited thereto) surrounding the first opening O1, so as to limit the solution to be tested 200 within the third opening O3 and prevent the solution to be tested 200 from overflowing outside the third opening O3, as shown in FIG. 5 and FIG. 6. For example, when the solution to be tested 200 added to the first opening O1 exceeds the second opening O2 (or when the upper surface 200*a* of the solution to be tested 200 added to the first opening O1 is higher than the upper surface 1511 of the flat part 151), the setting of the protruding part 152 may limit the solution to be tested 200 within the third opening O3 and prevent the solution to be tested 200 from overflowing, so as to avoid the solution to be tested interfering with the results of another biological material by overflowing to another adjacent reaction region. Thus, compared with a general biochip, the biochip 100 of the embodiment may increase the volume of the biochip 100 that can hold the solution to be tested 200 through the setting of the third opening O3, so as to cope with a larger amount of the solution to be tested 200, and to improve the operation margin and convenience of the biochip 100. In this way, multiple reaction regions may be disposed in the biochip 100 of the embodiment to detect different biological materials at the same time, and there is no need to worry about a problem of cross-contamination due to the overflow of the solution to be tested between the different reaction regions, thus achieving an effect of detecting multiple biological materials at the same time.

Other embodiments will be listed below for illustration. It should be noted here that the following embodiments continue to use the reference numerals and some content of the foregoing embodiment, wherein the same reference numerals are adopted to indicate the same or similar elements, and the description of the same technical content is omitted. The description of the omitted parts can be found in the foregoing embodiment and will not be repeated in the following embodiments.

FIG. 7 to FIG. 10 are schematic three-dimensional views of a manufacturing method of a biochip according to another embodiment of the disclosure. FIG. 11 is a schematic cross-sectional view of the biochip of FIG. 10 along a section line III-III'. For clarity of the drawing and ease of illustration, FIG. 10 omits the semiconductor layer 120, the first transfer pad 120*a*, the second transfer pad 120*b*, the metal layer 140*a*, and the solution to be tested 200 in a biochip 100*a*.

Referring to FIG. 1 to FIG. 6 and FIG. 7 to FIG. 11 together, since the biochip 100*a* of this embodiment is similar to the biochip 100 of FIG. 1 to FIG. 6, the components of this embodiment that are the same or similar to the embodiments of FIG. 1 to FIG. 6 can be carried out using the same materials or methods, and therefore, the same and similar descriptions in the two embodiments will not be repeated in the following, and will mainly focus on the differences between the two embodiments.

Specifically, a manufacturing method of the biochip 100*a* of this embodiment may include the following steps.

Figure 7:
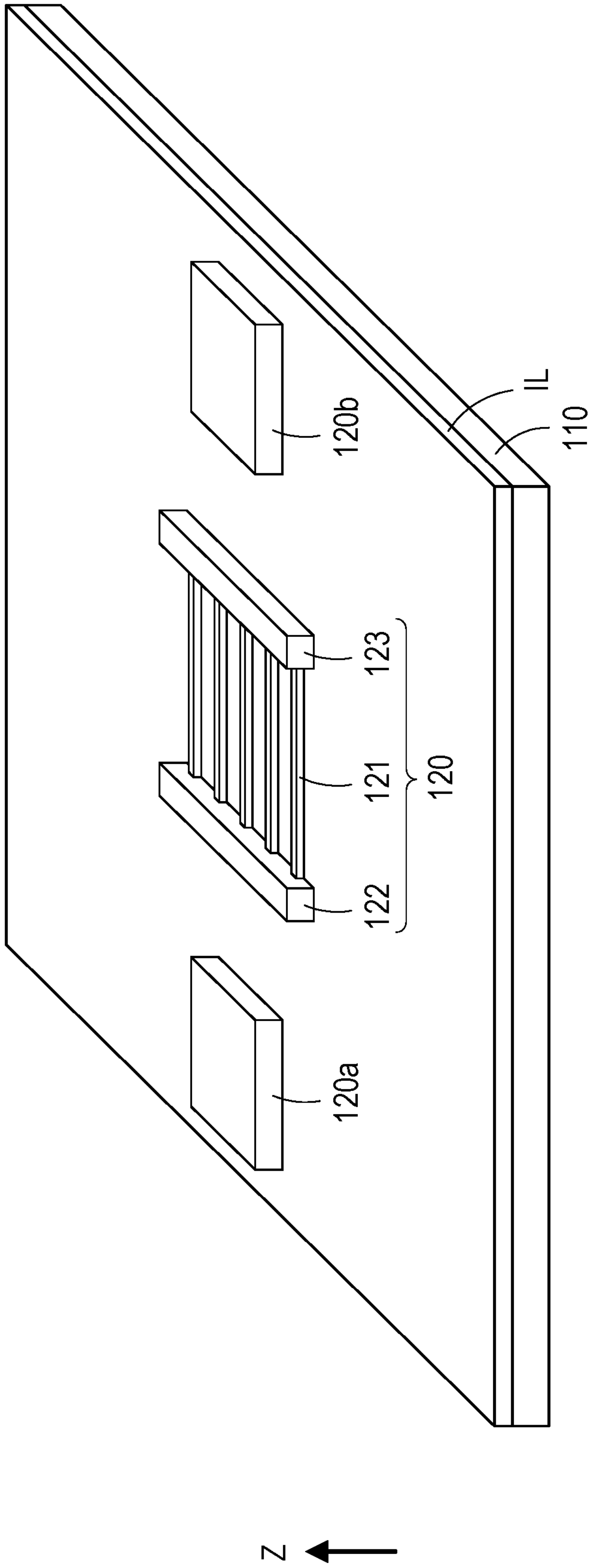
FIG. 7 to FIG. 10 are schematic three-dimensional views of a manufacturing method of a biochip according to another embodiment of the disclosure.

First, referring to FIG. 7, a substrate 110 is provided, and a semiconductor layer 120, a first transfer pad 120*a*, and a second transfer pad 120*b* is formed on an insulating layer IL. The semiconductor layer 120, the first transfer pad 120*a*, and a second transfer pad 120*b* are disposed on the same layer, and the semiconductor layer 120, the first transfer pad 120*a*, and the second transfer pad 120*b* are physically separated from each other. In this embodiment, materials of the first transfer pad 120*a* and the second transfer pad 120*b* may include polysilicon or other suitable semiconductor materials, but are not limited thereto.

Figure 8:
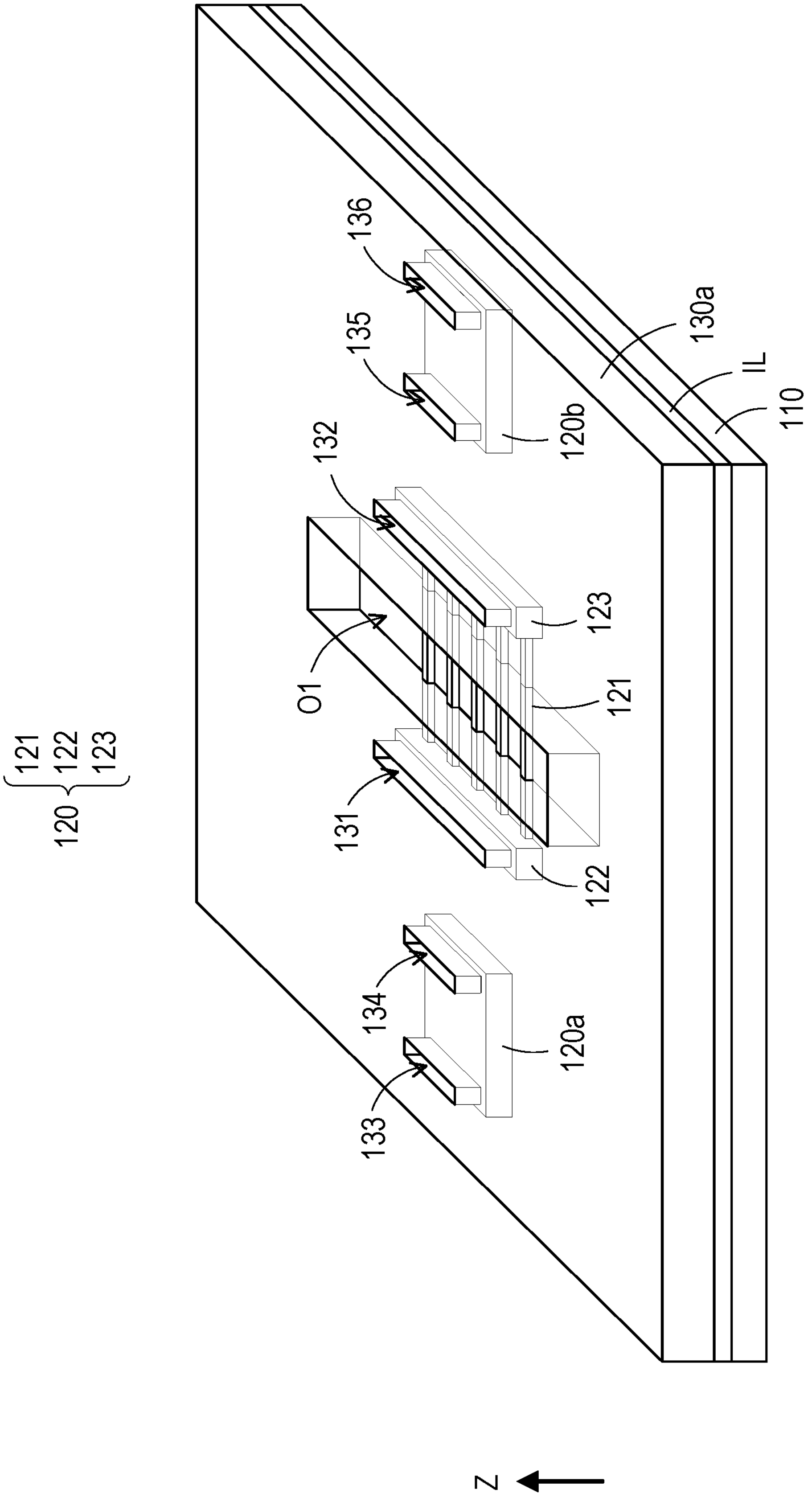

Then, referring to FIG. 8, a dielectric layer 130*a* is formed on the semiconductor layer 120, the first transfer pad 120*a*, and the second transfer pad 120*b*. The dielectric layer 130*a* has a first opening O1, an opening 131, an opening 132, an opening 133, an opening 134, an opening 135, and an opening 136. The opening 133 and the opening 134 may respectively expose different parts of the first transfer pad 120*a*, and the opening 135 and the opening 136 may respectively expose different parts of the second transfer pad 120*b*.

Figure 9:
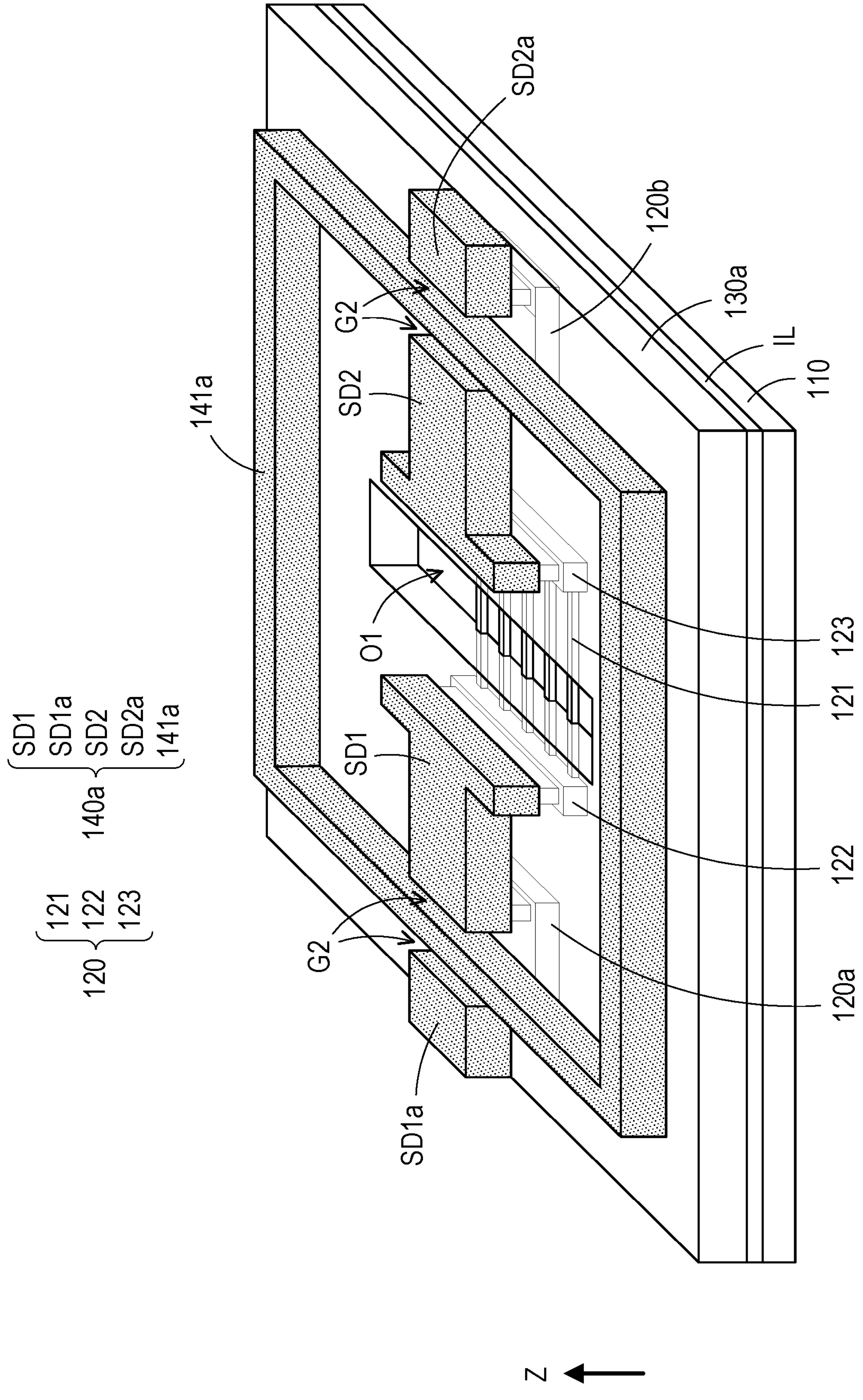

Then, referring to FIG. 9, a metal layer 140*a* is formed on the dielectric layer 130*a*. In this embodiment, the metal layer 140*a* may include a source SD1, a drain SD2, a wall structure 141*a*, a source extension pad SD1*a*, and a drain extension pad SD2*a*. The source SD1 may be disposed on the dielectric layer 130*a* and in the openings 134 and 131, so that the source SD1 may be electrically connected to the first transfer pad 120*a* and a source region 122 of the semiconductor layer 120 respectively. The source extension pad SD1*a* may be disposed on the dielectric layer 130*a* and in the opening 133, so that the source extension pad SD1*a* may be electrically connected to the first transfer pad 120*a*. The drain SD2 may be disposed on the dielectric layer 130*a* and in the openings 132 and 135, so that the drain SD2 may be electrically connected to a drain region 123 and the second transfer pad 120*b* of the semiconductor layer 120 respectively. The drain extension pad SD2*a* may be disposed on the dielectric layer 130*a* and in the opening 136, so that the drain extension pad SD2*a* may be electrically connected to the second transfer pad 120*b*. In other words, the source SD1 may be electrically connected to the source extension pad SD1*a* through the first transfer pad 120*a*, and the drain SD2 may be electrically connected to the drain extension pad SD2*a* through the second transfer pad 120*b*.

In this embodiment, in a three-dimensional view of the biochip 100*a*, the wall structure 141*a* may completely surround the first opening O1. There is a minimum distance G2 between the wall structure 141*a* and the source SD1, between the wall structure 141*a* and the source extension pad SD1*a*, between the wall structure 141*a* and the drain SD2, and between the wall structure 141*a* and the drain extension pad SD2*a*. The minimum distance G2 may be, for example, greater than 0 micrometers, but is not limited thereto. Furthermore, in this embodiment, an outline shape of the wall structure 141*a* may be a rectangle, but is not limited thereto.

Figure 10:
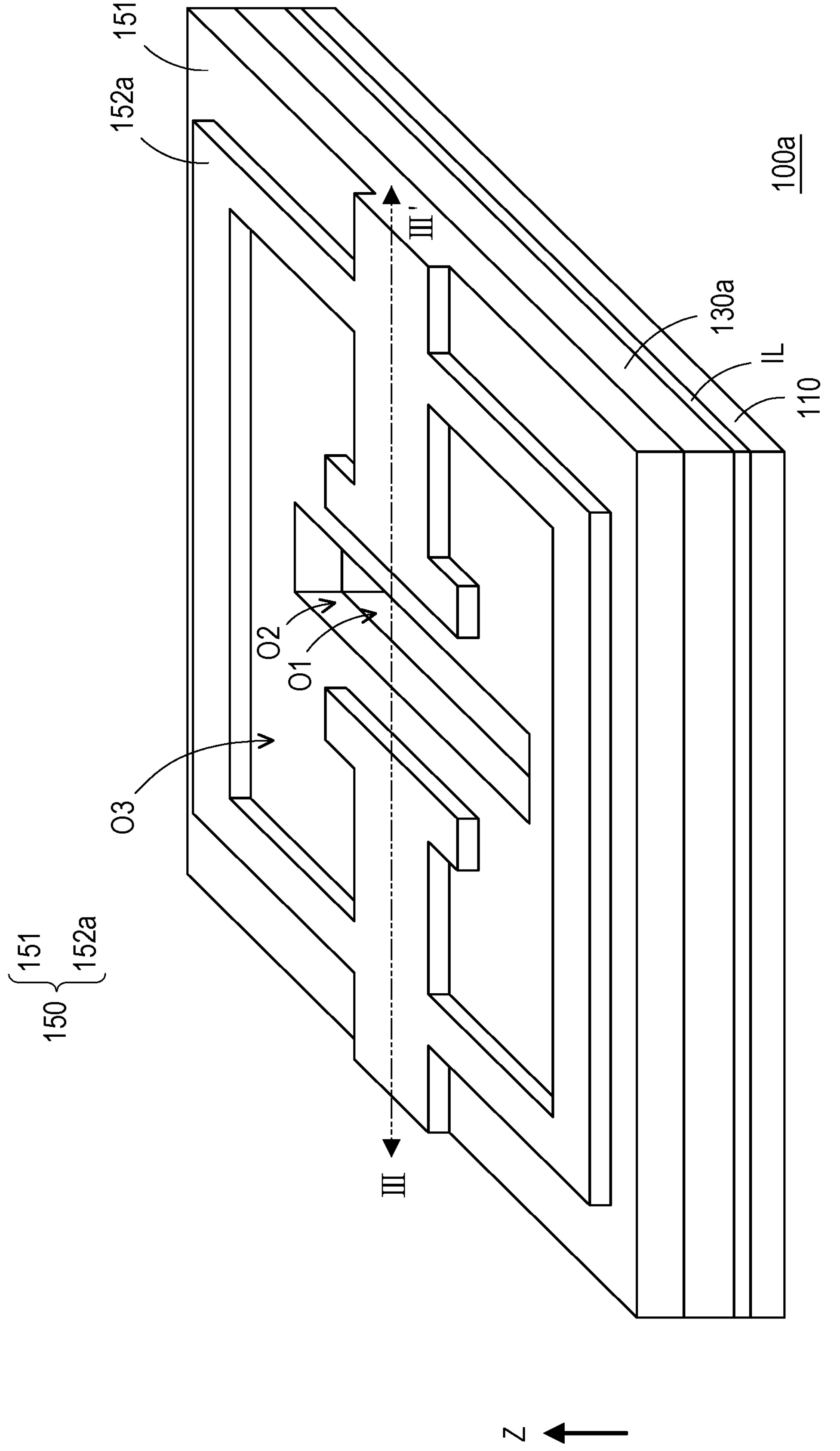
Figure 11:
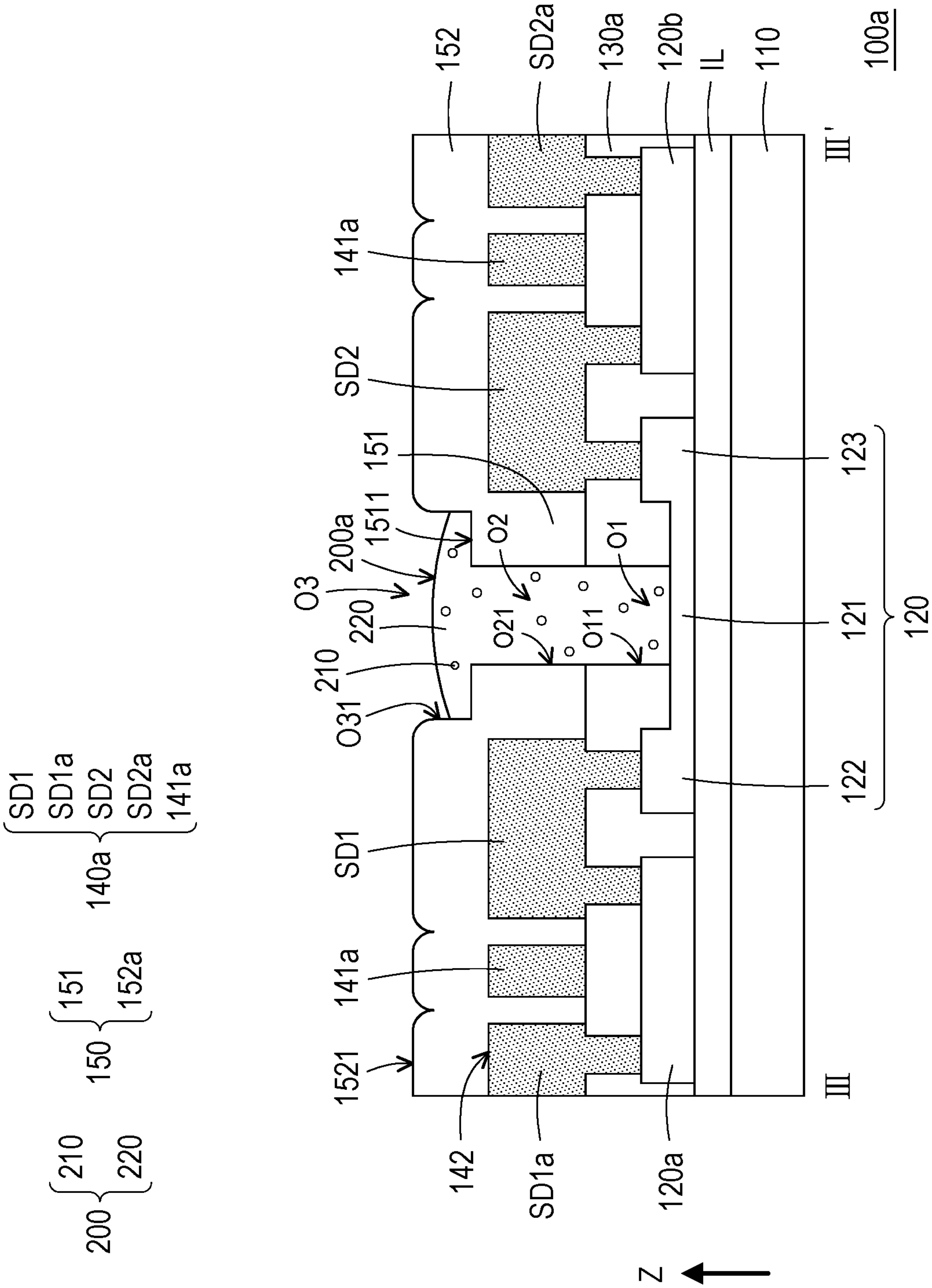
FIG. 11 is a schematic cross-sectional view of the biochip of FIG. 10 along a section line III-III'.

Then, referring to FIG. 10 and FIG. 11, a protective layer 150 is formed on the metal layer 140*a*. In this embodiment, the protective layer 150 has a flat part 151, a protruding part 152*a*, a second opening O2, and a third opening O3. The protruding part 152*a* may be disposed corresponding to the wall structure 141*a*, the source SD1, the drain SD2, the source extension pad SD1*a*, and the drain extension pad SD2*a* in the normal direction Z of the substrate 110. The protruding part 152*a* may surround and define the third opening O3, and the protruding part 152*a* may be disposed to form the third opening O3. The protruding part 152*a* may completely surround the first opening O1 and the second opening O2.

In the biochip 100*a* of this embodiment, since the wall structure 141*a* is a closed and unnotched ring structure, it is ensured that the protruding part 152*a* of the protective layer 150 formed on the wall structure 141*a* should also be a closed and unnotched ring structure.

In the biochip 100*a* of this embodiment, since the source SD1 and the drain SD2 need to transmit or receive signals through the setting of the first transfer pad 120*a* and the second transfer pad 120*b* respectively, the signal strength will be attenuated. On the contrary, since the source SD1 and the drain SD2 of the biochip 100 shown in FIG. 1 to FIG. 6 do not need to transmit or receive signals through the setting of the transfer pad, the risk of signal attenuation may be avoided.

To sum up, in the biochip and the manufacturing method thereof according to an embodiment of the disclosure, the setting of the wall structure enables the protruding part to be formed at the same time as the protective layer is formed, and thus has an effect of simplifying the process. As the protruding part may be a closed figure surrounding the first opening, the solution to be tested may be limited within the third opening to avoid overflow of the solution to be tested from outside the third opening. Compared with a general biochip, the biochip of the disclosure may increase the volume of the biochip that can hold the solution to be tested through the setting of the third opening, so as to avoid the overflow of the solution to be tested and to cope with a larger amount of the solution to be tested, and to improve the operation margin and convenience of the biochip. In this way, when multiple reaction regions are disposed in the biochip of the disclosure, the reaction regions may be utilized to detect different kinds of biological materials respectively, and there is no need to worry about a problem of cross-contamination due to the overflow of the solution to be tested between the different reaction regions, thus achieving an effect of detecting multiple biological materials at the same time.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. A biochip, configured to detect a biological material in a solution to be tested, comprising:

a substrate;

an insulating layer, disposed on the substrate;

a semiconductor layer, disposed on the insulating layer, having a reaction region;

a dielectric layer, disposed on the semiconductor layer, having a first opening;

a metal layer, disposed on the dielectric layer, comprising:

a source and a drain, electrically connected to the semiconductor layer respectively;

and a wall structure, surrounding the first opening of the dielectric layer, and the source and drain of the metal layer; and a protective layer, disposed on the metal layer, having a flat part, a protruding part, a second opening, and a third opening;

wherein the flat part of the protective layer surrounds and defines the second opening, and the protruding part surrounds and defines the third opening of the protective layer, and wherein the second opening connects the third opening and the first opening, and the second opening is configured to expose the reaction region.

2. The biochip according to claim 1, wherein the source, the drain, and the wall structure are separated from each other, and the source and the drain are electrically insulated from the wall structure.

3. The biochip according to claim 1, wherein in a three-dimensional view of the biochip, the wall structure does not completely surround the first opening.

4. The biochip according to claim 1, wherein in a three-dimensional view of the biochip, the wall structure completely surrounds the first opening.

5. The biochip according to claim 1, wherein a minimum distance between the wall structure and the source is 0.1 micrometers to 5 micrometers.

6. The biochip according to claim 1, wherein in a three-dimensional view of the biochip, the third opening is larger than the second opening.

7. The biochip according to claim 1, wherein the protruding part completely surrounds the first opening and the second opening.

8. The biochip according to claim 1, wherein the solution to be tested is disposed in the first opening, and an upper surface of the solution to be tested is between an upper surface of the protruding part and an upper surface of the flat part.

9. The biochip according to claim 1, wherein the metal layer further comprises a source extension pad and a drain extension pad, and the biochip further comprises:

a first transfer pad and a second transfer pad, disposed on the insulating layer respectively, wherein the source is electrically connected to the source extension pad through the first transfer pad, and the drain is electrically connected to the drain extension pad through the second transfer pad.

10. A manufacturing method of a biochip, wherein the biochip is configured to detect a biological material in a solution to be tested, and the manufacturing method comprises:

providing a substrate;

forming an insulating layer on the substrate;

forming a semiconductor layer on the insulating layer, wherein the semiconductor layer has a reaction region;

forming a dielectric layer on the semiconductor layer, wherein the dielectric layer has a first opening;

forming a metal layer on the dielectric layer, wherein the metal layer comprises:

a source and a drain, electrically connected to the semiconductor layer respectively; and a wall structure, surrounding the first opening of the dielectric layer, and the source and drain of the metal layer; and forming a protective layer on the metal layer, wherein the protective layer has a flat part, a protruding part, a second opening, and a third opening;

wherein the flat part of the protective layer surrounds and defines the second opening, and the protruding part surrounds and defines the third opening of the protective layer, and wherein the second opening connects the third opening and the first opening to expose the reaction region.

* * * * *